3,192,057
ANTIBACTERIAL COATING COMPOSITIONS
Leonard Russell Hines, Ridgewood, and Richard Jay Shirk, Hamilton Square, N.J., assignors to American Cyanamid Company, New York, N.Y., a corporation of Maine
No Drawing. Filed Oct. 6, 1961, Ser. No. 143,318
7 Claims. (Cl. 106—15)

This invention relates to antibacterial coating compositions and, more particularly, to food coating compositions consisting of acylated glycerides having dispersed therein broad spectrum tetracycline antibiotics. The process of preparing these antibacterial coating compositions and the method of coating foodstuffs therewith are encompassed within the purview of the present invention.

Acylated glycerides have been used for some time as coating materials for various food products such as meat, fish, and cheese, in order to protect them against loss of moisture and general contamination. These acylated glycerides may be represented by the following general formula:

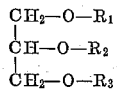

in which $R_1$ is the acyl radical of a fatty acid of from 12 to 22 carbon atoms, $R_2$ is hydrogen, the acyl radical of a fatty acid of from 2 to 5 carbon atoms, or the acyl radical of a fatty acid of from 12 to 22 carbon atoms, and $R_3$ is hydrogen or the acyl radical of a fatty acid of from 2 to 5 carbon atoms. These acylated glycerides may be either a single chemical compound or a mixture of acylated glycerides each conforming to the above general formula. Although some of these acylated glycerides may be obtained by the extraction of various natural fats and oils, they are usually prepared synthetically by the acylation of glycerine or partially acylated glycerides. They are usually applied to the article of food in the liquid state, and then allowed to solidify by cooling. Acylated glycerides and mixtures thereof conforming to the above general formula are commercially available under the brand name Myvacet from the Distillation Products Industries Division of Eastman Kodak Co., Rochester, N.Y.

Although the acylated glycerides have afforded some protection to foodstuffs when used as a coating therefor, they have not curbed bacterial spoilage since they are not effective as antibacterial agents. Various attempts have been made to solve this problem in the food coating art. The application of antibacterial agents to the foodstuffs prior to coating has been attempted. However, this requires the additional step of dipping or spraying the article of food with the antibacterial agent which involves added expense in the processing of the food. Furthermore, this treatment usually leaves a residual aqueous film on the food which interferes with the adherence of the coating composition thereto.

Our invention is based upon the discovery that an antibacterial coating composition having a prolonged bactericidal effect may be obtained by dispersing from about 0.0001% to about 0.0025% by weight of a broad spectrum tetracycline antibiotic in a coating composition consisting of acylated glycerides. It is indeed surprising that the broad spectrum tetracycline antibiotics used in the present invention are stable in the acylated glycerides at temperatures up to 200° C. This stability of the antibiotics at such temperatures is totally unexpected in view of the known sensitivity of the tetracycline antibiotics to elevated temperatures. Another surprising aspect of the present invention is the fact that the tetracycline antibiotics and salts thereof, employed in the practice of the present invention, readily diffuse from the acylated glycerides coating onto the surface of the coated food. Very likely, this is due to the fact that these antibiotics and their salts are generally more soluble in the water content of the coated foodstuff than in the acylated glycerides coating. This theory of the prolonged bactericidal effect of the novel antibacterial coating compositions of the present invention is deduced from the fact that the inhibitory activity of the antibiotics remains available long after the acylated glycerides coating is applied to a foodstuff, whereas there is virtually no such migration of the antibiotics from coatings such as microcrystalline wax. However, it is not intended that the present invention should be limited by any theory of operation.

The broad spectrum of tetracycline antibiotics contemplated for use in the antibacterial coating compositions of the present invention are tetracycline, 7-chlorotetracycline, 5-hydroxytetracycline, 6-dimethyl-7-chlorotetracycline, and the salts thereof. As indicated hereinabove, concentrations of antibiotics as low as 0.0001% by weight dispersed in acylated glycerides coating compositions have been found effective in inhibiting microbial proliferation. Concentrations of antibiotics in excess of 0.0025% by weight are, naturally, effective but unnecessary and impractical in view of the high cost of these antibiotics. The range of from about 0.0005% to about 0.0010% by weight of antibiotic in the acylated glycerides coating is preferred in the practice of the present invention.

The preparation of the novel antibacterial coating compositions of the present invention is readily achieved by liquefying the acylated glycerides and dispersing the antibiotics therein. An alternate method of incorporating the antibiotics in the liquefied acylated glycerides consists in first dissolving the antibiotic in a small amount of solvent therefor such as butyl Caritol, butyl Cellosolve, diethyl Cellosolve, methyl Carbitol and the like, and then dispersing the resultant solution in the liquefied acylated glycerides.

Various pigments such as titanium dioxide or coloring materials such as F.D. & C. Lake Yellow No. 5 may be added to the hot melt so as to produce a colored coating. Also, various antioxidants may be added to the hot melt so as to provide long term stability to the films formed therewith. Various fillers, modifying agents, and strengthening agents may also be added to the hot melt prior to its application to a foodstuff.

Application of the novel antibacterial coating compositions of the present invention is not limited to any particular method. The object to be protected may be coated by such known methods as, for example, by dipping, by enrobing, or by employing a falling or a projected film. The novel compositions of the present invention may also be applied by spraying in a volatile solvent or simply as a hot melt of the coating composition. The invention will be described in greater detail in conjunction with the following specific examples.

EXAMPLE 1

A commercially available mixture of acetoglycerides acylated with 50% oleic acid, 30% stearic acid, 10% palmitic acid, and 10% of other acyl radicals (sp. gr. =0.94) was liquefied by warming to about 60° C. A solution of 5 micrograms of 7-chlorotetracycline per milliliter of liquefied acylated glyceride was prepared and this was kept 118° C. for 18 hours. Similarly, a solution of 5 micrograms of 7-chlorotetracycline hydrochloride per milliliter of liquefied acylated glyceride was prepared and this was also kept at 118° C. for 18 hours. Samples were extracted periodically from both solutions for microbiological assay.

Control solutions of 5 micrograms per milliliter of 7-chlorotetracycline base and its hydrochloride in distilled water were heated to 95° C. Samples were extracted periodically from both solutions for microbiological assay until all the antibiotic had been destroyed. All the assays were made using a standard pad plate method employing $B.\ cereus$ as the test organism.

The results are summarized in Table I below.

Table I

HEAT STABILITY OF CHLORTETRACYCLINE DISSOLVED IN ACYLATED GLYCERIDE FOOD COATING

| | mm.—Zone of inhibition of $B.\ cereus$ | | | | | | |
|---|---|---|---|---|---|---|---|
| | Hours | | | | | | |
| | 0 | 0.5 | 1 | 2 | 3 | 4 | 18 |
| 7-chlorotetracycline in water at about 95° C | 24.3 | 22.9 | 0 | 0 | | | |
| 7-chlorotetracycline in acylated glyceride at 118° C | 21.25 | 20.35 | 20.2 | 21.3 | 19.55 | 19.3 | 14.1 |
| 7-chlorotetracycline hydrochloride in water at about 95° C | 22.9 | 21.35 | 17.1 | 0 | | | |
| 7-chlorotetracycline hydrochloride in acylated glyceride at 118° C | 22.1 | 19.4 | 18.5 | 19.3 | 17.1 | 18.45 | 13.8 |

EXAMPLE 2

Example 1 was repeated except that tetracycline hydrochloride and 5-hydroxytetracycline hydrochloride were substituted for the 7-chlorotetracycline and 7-chlorotetracycline hydrochloride of that example. Also, the acylated glyceride solutions were heated at 120° for 2 hours rather than at the 118° C. for 18 hours as in Example 1.

The results are summarized in Table II below.

Table II

HEAT STABILITY OF TETRACYCLINE AND OXYTETRACYCLINE DISSOLVED IN ACYLATED GLYCERIDE COATING

| | mm.—Zone of inhibition $B.\ cereus$ | | | | |
|---|---|---|---|---|---|
| | Hours | | | | |
| | 0 | 0.5 | 1 | 1.5 | 2 |
| Tetracycline hydrochloride in water at 95° C | 18.25 | | 12.95 | | 0 |
| Tetracycline hydrochloride in acylated glyceride at 120° C | 16.3 | 14.8 | 14.9 | 14.1 | 13.05 |
| 5-hydroxytetracycline hydrochloride in water at about 95° C | 17.85 | | 0 | | |
| 5-hydroxytetracycline hydrochloride in acylated glyceride at 120° C | 13.65 | 15.05 | 11.6 | 13.5 | 12.35 |

EXAMPLE 3

A commercially available acylated glyceride having over 90% of 3-aceto-1-stearyl substitution and 10% other acyl substituents, was warmed to 120° C. 7-chlorotetracycline base was dissolved therein at a concentration of 10 micrograms per milliliter. This antibiotic-glyceride coating was used to coat frankfurters by dipping, at 115°–120° C., for 10 seconds. The following groups of 5 frankfurters each were set up:

(1) Control frankfurters—no treatment.
(2) Frankfurters dipped in glyceride without antibiotic.
(3) Frankfurters dipped in glyceride-antibiotic coating solution.

Bacterial counts were made initially and were repeated after two days at room temperature.

The results are summarized in Table III below and indicate that 7-chlorotetracycline inhibited the growth of spoilage organisms as compared with the glyceride treated frankfurters containing no 7-chlorotetracycline.

Table III

[Bacterial counts×10⁶ at room temperature]

| | Initially—Untreated | After 2 days | | |
|---|---|---|---|---|
| | | Untreated | Dipped in glyceride | Dipped in glyceride+ 10γ CTC/ml. |
| 1 | 2.59 | 131 | 127 | 83.7 |
| 2 | 0.85 | 135 | 163.6 | 109 |
| 3 | 3.86 | 119 | 204 | 60.3 |
| 4 | 1.97 | 141 | 169 | 65 |
| 5 | 1.81 | 132 | 198.3 | 174 |
| Avg | 2.264 | 131.6 | 172.4 | 98.4 |

What is claimed is:

1. An antibacterial coating composition consisting essentially of acylated glycerides having the general formula:

$$CH_2-O-R_1$$
$$CH-O-R_2$$
$$CH_2-O-R_3$$

wherein $R_1$ is the acyl radical of a fatty acid of from 12 to 22 carbon atoms, $R_2$ is selected from the group consisting of hydrogen, the acyl radical of a fatty acid of from 2 to 5 carbon atoms and the acyl radical of a fatty acid of from 12 to 22 carbon atoms, and $R_3$ is selected from the group consisting of hydrogen and the acyl radical of a fatty acid of from 2 to 5 carbon atoms, said acylated glycerides having dispersed therein from about 0.0001% to about 0.0025% by weight of a tetracycline antibiotic.

2. An antibacterial coating composition according to claim 1 in which the tetracycline antibiotic is tetracycline.

3. An antibacterial coating composition according to claim 1 in which the tetracycline antibiotic is 7-chlorotetracycline.

4. An antibacterial coating composition according to claim 1 in which the tetracycline antibiotic is 5-hydroxytetracycline.

5. An antibacterial coating composition according to claim 1 in which the tetracycline antibiotic is 6-demethyl-7-chlorotetracycline.

6. A process of preparing an antibacterial coating composition which comprises dispersing from about 0.0001% to about 0.0025% by weight of a tetracycline antibiotic in a liquefied coating composition consisting essentially of acylated glycerides having the general formula:

$$CH_2-O-R_1$$
$$CH-O-R_2$$
$$CH_2-O-R_3$$

wherein $R_1$ is the acyl radical of a fatty acid of from 12 to 22 carbon atoms, $R_2$ is selected from the group consisting of hydrogen, the acyl radical of a fatty acid of from 2 to 5 carbon atoms and the acyl radical of a fatty acid of from 12 to 22 carbon atoms, and $R_3$ is selected from the group consisting of hydrogen and the acyl radical of a fatty acid of from 2 to 5 carbon atoms.

7. A process according to claim 6 in which the tetracycline antibiotic is selected from the group consisting of tetracycline, 7-chlorotetracycline, 5-hydroxytetracycline, and 6-demethyl-7-chlorotetracycline.

References Cited by the Examiner
UNITED STATES PATENTS

| | | | |
|---|---|---|---|
| 2,585,501 | 2/52 | Rusoff et al. | 99—116 |
| 2,808,421 | 10/57 | Brokaw | 99—166 X |
| 3,000,748 | 9/61 | Clark | 99—169 X |

OTHER REFERENCES

Meyer et al.: Food Technology, February 1959, pp. 146–148.

A. LOUIS MONACELL, *Primary Examiner*.

ABRAHAM H. WINKELSTEIN, *Examiner*.